(12) United States Patent
Kadotani et al.

(10) Patent No.: US 7,455,888 B2
(45) Date of Patent: Nov. 25, 2008

(54) METHOD AND APPARATUS FOR FORMING CATALYST LAYER ON SUBSTRATE CONSTITUTING MEMBRANE ELECTRODE ASSEMBLY

(75) Inventors: Satoshi Kadotani, Owariasahi (JP); Tatsuya Kawahara, Toyota (JP); Masashi Murate, Nagoya (JP); Yoshifumi Kaji, Okazaki (JP)

(73) Assignee: Toyota Jidosha Kabushiki Kaishi, Toyota-shi (JP)

( * ) Notice: Subject to any disclaimer, the term of this patent is extended or adjusted under 35 U.S.C. 154(b) by 0 days.

(21) Appl. No.: 10/588,150

(22) PCT Filed: Feb. 18, 2005

(86) PCT No.: PCT/JP2005/003079

§ 371 (c)(1),
(2), (4) Date: Aug. 1, 2006

(87) PCT Pub. No.: WO2005/080008

PCT Pub. Date: Sep. 1, 2005

(65) Prior Publication Data

US 2007/0129237 A1    Jun. 7, 2007

(30) Foreign Application Priority Data

Feb. 19, 2004    (JP)    ............... 2004-042957

(51) Int. Cl.
B05D 1/32    (2006.01)
(52) U.S. Cl. ............. 427/468; 427/469; 427/472; 427/58
(58) Field of Classification Search ............. 427/466, 427/468, 469, 472, 475, 58
See application file for complete search history.

(56) References Cited

U.S. PATENT DOCUMENTS 3,081,698 A * 3/1963 Childress et al. ............ 101/129

(Continued)

FOREIGN PATENT DOCUMENTS

DE    195 48 422 A1    9/1997

(Continued)

OTHER PUBLICATIONS

Second and supplementary Notice Informing the applicant of the communication of the International Application (To Designated Offices which apply the 30 Month time Limit Under Article 22 (1)) for International application No. PCT/JP2005/003079.

(Continued)

Primary Examiner—Frederick J Parker
(74) Attorney, Agent, or Firm—Finnegan, Henderson, Farabow, Garrett & Dunner LLP

(57) ABSTRACT

In an apparatus A in which electrode powder 10 is allowed to adhere via the electrostatic force to an electrolyte membrane that serves as a substrate 2 so as to form a catalyst layer, a screen 5 is held in a state of non-contact with the substrate 2, and a voltage is applied therebetween. The electrode powder 10 is allowed to adhere to an elastic feed roller 7, and the feed roller 7 is allowed to rotate in contact with the screen 5 by pressure. The electrode powder 10 is dispersed toward the substrate 2 so as to stably adhere thereto via both the electrostatic force and the extruding force of the elastic body.

Variation of thickness and collapse of the outline are extremely reduced on the catalyst layer to be transferred and formed on the substrate (electrolyte membrane) via the electrostatic force using a conventionally used mesh-like screen so as to obtain a membrane electrode assembly with a high product manufacturing accuracy.

5 Claims, 1 Drawing Sheet

U.S. PATENT DOCUMENTS

| | | | |
|---|---|---|---|
| 6,533,995 | B1 * | 3/2003 | Wullenweber et al. ......... 419/9 |
| 2003/0054225 | A1 | 3/2003 | Kaji et al. |
| 2003/0096154 | A1 * | 5/2003 | Yasumoto et al. ............ 429/40 |

FOREIGN PATENT DOCUMENTS

| | | |
|---|---|---|
| DE | 696 08 632 T2 | 2/2001 |
| DE | 102 43 100 A1 | 4/2003 |
| JP | 56-017664 | 2/1981 |
| JP | 11-126602 | 5/1999 |
| JP | 11-288728 | 10/1999 |
| JP | 2001-160399 | 6/2001 |
| JP | 2002-367616 | 12/2002 |
| JP | 2003-163011 | 6/2003 |
| JP | 2004-281221 | 10/2004 |
| WO | WO 96/37003 | 11/1996 |
| WO | WO 00/26982 A2 | 5/2000 |

OTHER PUBLICATIONS

Notification of Transmittal of Copies of translation of the International Preliminary report on Patentability for International application No. PCT/JP2005/003079.

International Preliminary Report on Patentability for International application No. PCT/JP2005/003079.

English translation of Written Opinion of the International Searching authority for International application No. PCT/JP2005/003079.

Office Action for the corresponding German patent application No. 112005000257.8-45 dated Nov. 7, 2007.

* cited by examiner

METHOD AND APPARATUS FOR FORMING CATALYST LAYER ON SUBSTRATE CONSTITUTING MEMBRANE ELECTRODE ASSEMBLY

TECHNICAL FIELD

The present invention relates to a method and an apparatus for forming a catalyst layer on a substrate (an electrolyte membrane or a gas diffusion layer) of a membrane electrode assembly that is used in a fuel cell, and particularly in a solid polymer fuel cell.

BACKGROUND ART

A solid polymer fuel cell comprises a membrane electrode assembly (MEA) comprising an electrolyte membrane (comprising an ion-exchange membrane) and catalyst layers and gas diffusion layers that are disposed on both sides of the electrolyte membrane, a separator laminated on the MEA, and the like. Catalyst layers may be formed on an electrolyte membrane first or on gas diffusion layers first. In the former case, on catalyst layers that have been formed on an electrolyte membrane that serves as a substrate, gas diffusion layers are laminated by heating and pressing, so that an MEA is obtained. In the latter case, gas diffusion layers are laminated in a way such that catalyst layers that have been formed on gas diffusion layers face both sides of an electrolyte membrane so that an MEA is obtained.

A catalyst layer contains electrode powder (catalyst supporting conductor) such as platinum-supporting carbon. As described above, a catalyst layer is formed by a method whereby electrode powder is disposed on an electrolyte membrane or a gas diffusion layer that serves as a substrate. An example of such method that has been conventionally carried out is so-called wet application, wherein an electrode ink is applied to a substrate by screen printing, a blade technique, roller coating, spraying, or the like. A method that has recently started to be adopted is a dry method for dispersing electrode powder toward an electrolyte membrane or a gas diffusion layer that serves as a substrate utilizing the electrostatic force or flow of gas (carrier gas) for the direct adhesion of the powder.

JP Patent Publication (Kokai) No. 2003-163011 A discloses a method of continuous production of MEAs by a dry method utilizing the electrostatic force. In such method, electrode powder is applied to a drum in a predetermined pattern to be electrically charged, and the electrode powder is transferred to a continuously supplied electrolyte membrane using the electrostatic force for fixation by heating and pressing. JP Patent Publication (Kokai) No. 2002-367616 A discloses a technique wherein platinum-supporting carbon that serves as electrode powder is electrically charged, the carbon is allowed to cumulate on a roller while being subjected to patterning via a control blade that controls the transferred pattern for transfer and fixation of the carbon on an electrolyte membrane, so that an MEA is obtained.

The present inventors have much experience with the production of MEAs by a dry method as described above. In such production process, when the transferred pattern becomes a complicated shape, the present inventors experienced deterioration in the product manufacturing accuracy. This was because variation of thickness or collapse of the outline of the pattern was found on a catalyst layer formed with electrode powder that had been transferred to an electrolyte membrane or a gas diffusion layer that serves as a substrate. Such problems can be resolved to some extent by increasing the applied voltage. However, the electric field is not allowed to be 3 kV/mm or more, at which level dielectric breakdown occurs. In addition, the flowing of a large current into electrode powder may cause ignition.

In a method described in JP Patent Publication (Kokai) No. 2002-367616 A, multiple ring electrodes are disposed to surround a hole formed on a control blade and electrode powder dispersion is carried out exclusively via a hole where positive potential is applied and not via a hole where negative potential is applied, so that it is possible to specify to which part of an electrolyte membrane electrode powder adheres. Therefore, it is expected that a catalyst layer having substantially uniform thickness would be formed. However, it is possible to form a control blade having such complicated structure, it is not practical because such blade increases the cost of an apparatus and requires complicated maintenance.

The present invention has been made under the circumstances described above. It is an object of the present invention to provide a method and an apparatus for forming a noble catalyst layer, wherein variation of thickness and collapse of the outline are extremely reduced on such catalyst layer that is transferred to a substrate via the electrostatic force using a conventionally used mesh-like screen, so that an MEA having a high product manufacturing accuracy can be obtained.

DISCLOSURE OF THE INVENTION

To solve the above problems, the present inventors have conducted much experimentation regarding an MEA production method with a dry method utilizing the electrostatic force. As a result, the present inventors have found that, regarding electrode powder dispersion occurring essentially solely by the electrostatic force, the charged electricity quantity is insufficient upon movement of electrode powder from a roller to which electrode powder has adhered to a substrate (hereafter the term "substrate" indicates both an electrolyte membrane and a gas diffusion layer in the present invention), so that problems such as variation of thickness and collapse of the outline as described above are generated. When extruding force toward a substrate was applied to electrically charged electrode powder on a screen using an elastic body, a high level of uniformity in thickness was observed across the transferred pattern, and collapse of the outline thereof was not generated.

The present invention is based on the above findings obtained by the present inventors. Basically, the present invention relates to a method for forming a catalyst layer by allowing electrode powder to adhere via the electrostatic force to a substrate that constitutes an MEA. The method comprises at least a step in which a screen is disposed in a state of non-contact with a substrate; voltage is applied between the screen and the substrate so as to electrically charge electrode powder supplied on the screen; the electrode powder is pressed by an elastic body; and electrode powder is dispersed toward the substrate so as to adhere thereto via both the electrostatic force and the extruding force of the elastic body. The electrode powder that has been applied in a desired shape by a dry method is fixed on a substrate by heat and pressure so that the substrate with a catalyst layer having the desired pattern can be obtained.

According to the method of the present invention, dispersion of electrode powder from a screen to a substrate is carried out via both the electrostatic force and extruding force so that the desired coating pattern can be obtained even at a low applied voltage. Preferably, the voltage between a substrate and a screen is approximately 0 kV to 10 kV and the distance therebetween is approximately 1 mm to 20 mm. More preferably, such voltage and distance are adequately specified between 1 kV and 5 kV and between 1 mm and 10 mm, respectively, under the condition of a dielectric breakdown electric field in air of 3 kV/mm or less.

As indicated in the following examples, when the method of present invention is employed, variation of thickness of a coating layer can substantially disappear, the outline of the pattern thereof becomes defined by reducing the distance between a substrate and a screen, and the electrode powder yield is improved. In addition, it is advantageous for a conventionally used mesh-like screen to be utilized as it is.

A process carried out in a further specific embodiment of the present invention is a process of dispersing electrode powder toward a substrate so that it adheres thereto using a feed roller made of an elastic material that serves as the above elastic body. The process includes a step of supplying electrode powder to a feed roller and a step of allowing the feed roller to which electrode powder has adhered to roll while being pressed against the screen. In this embodiment, the desired coating can be completed only by allowing the feed roller to roll over the screen so that the production process becomes simplified. In another preferable embodiment of the present invention, electrode powder is allowed to be electrically charged by corona discharge, friction, or the like, so that the electrode powder adheres to a feed roller in a certain manner.

In the present invention, an apparatus for forming a catalyst layer on a substrate, which can preferably carry out the above production method, is also disclosed. The apparatus of the present invention is an apparatus for forming a catalyst layer by allowing electrode powder to adhere via the electrostatic force to a substrate that constitutes an MEA. The apparatus at least comprises: a means of holding a screen in a state of non-contact with the substrate; a means of applying a voltage between the screen and the substrate; a means of supplying electrode powder to the screen; and a means of pressing electrode powder supplied to the screen toward the substrate. The apparatus is characterized in that electrode powder is dispersed toward the substrate so as to adhere thereto via both the electrostatic force and the extruding force of an elastic body.

Preferably, the above apparatus comprises a hopper that has accommodated electrode powder and a feed roller installed on the outlet side of the hopper. The feed roller is allowed to roll in contact with the screen by pressure. The feed roller constitutes a means of supplying electrode powder to the screen and a means of pressing electrode powder supplied to the screen toward the substrate. The electrode powder that has been accommodated in the hopper and the feed roller may be disposed in contact with each other at all times. Also, they may be disposed in a state of non-contact with each other so that electrode powder accommodated in the hopper falls onto the feed roller. Preferably, the apparatus comprises a means by which electrode powder accommodated in the hopper is electrically charged by corona discharge, confliction, or the like, so that electrode powder is allowed to adhere to the feed roller in a more certain manner. In addition, in the embodiment wherein electrode powder falls onto the feed roller, variation of coating thickness may be generated due to aggregation of falling electrically charged electrode powder. Thus, electrode powder does not necessarily become electrically charged.

In the present invention, an electrolyte membrane or a gas diffusion layer that serves as a substrate that may be used is an electrolyte membrane comprising arbitrary ion-exchange resin or a gas diffusion layer that is used upon production of MEAs used in a conventional solid polymer fuel cell. Electrode powder applied thereto that may be used in an adequate manner is a catalyst-supporting conductor such as platinum-supporting carbon. Further, examples of an elastic body, particularly an elastic body that constitutes a feed roller, which may be used, include polyethylene, polyurethane, polyethylene or polyurethane to which a blowing agent has been added, and gum to which a blowing agent has been added.

According to the present invention, when a catalyst layer is formed on a substrate that constitutes an MEA, a catalyst layer that has the required pattern with a defined outline and without variation of thickness can be formed by coating at a low applied voltage. Accordingly, the safety upon production and the electrode powder yield are also improved, as is the product manufacturing accuracy.

BEST MODE FOR CARRYING OUT THE INVENTION

Figure 1:
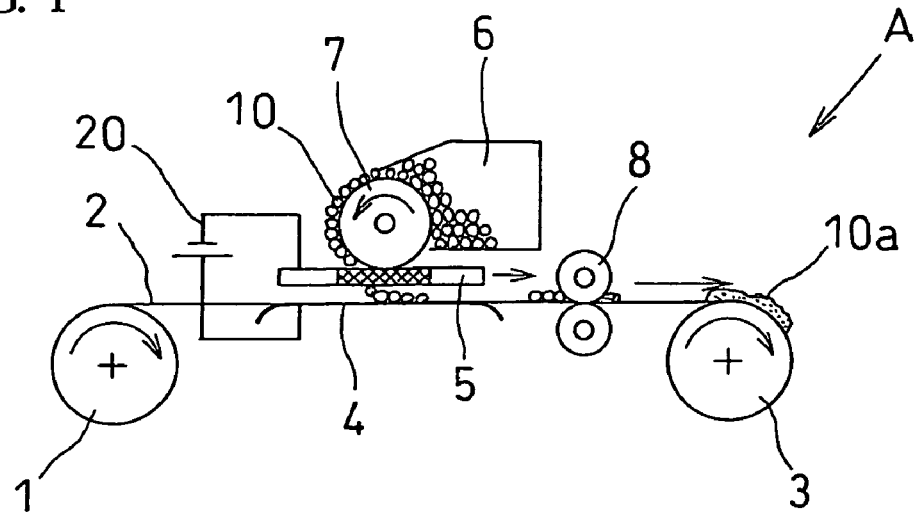
FIG. 1 shows a schematic diagram indicating one embodiment of an apparatus that can preferably carry out a method for forming a catalyst layer on a substrate that constitutes an MEA of the present invention.
Figure 2:
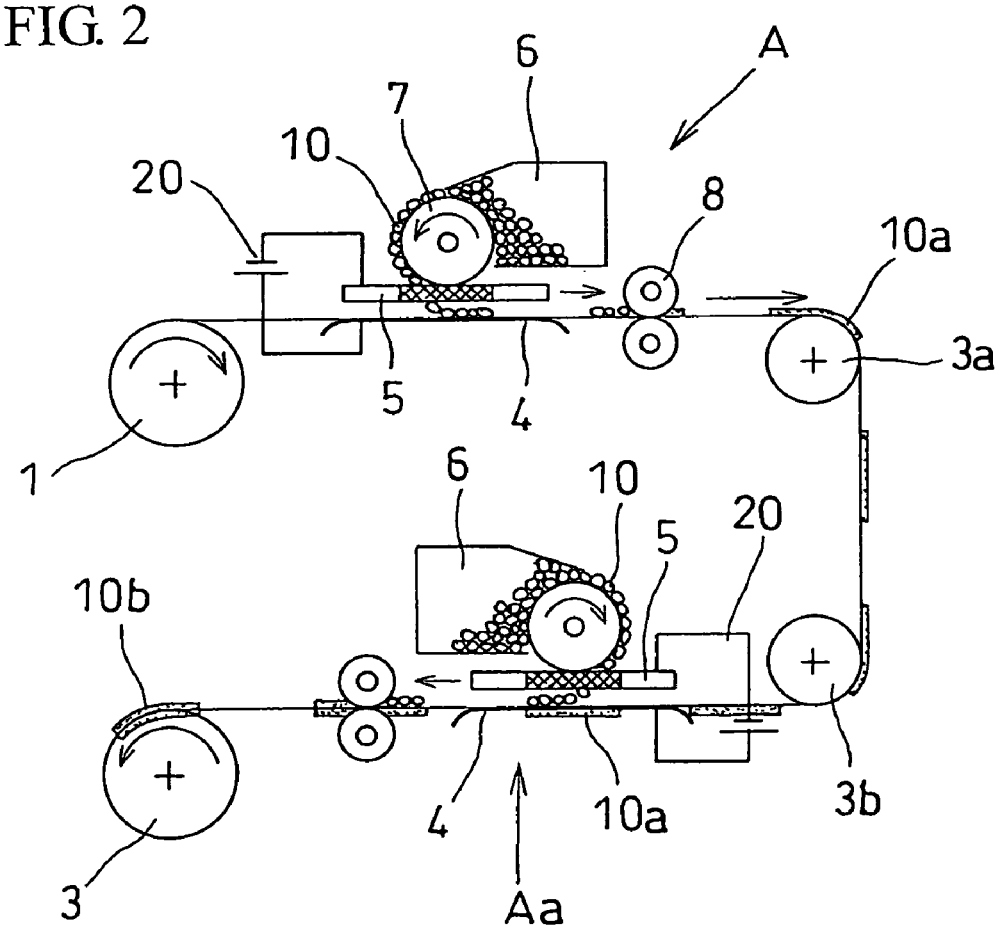
FIG. 2 shows a schematic diagram indicating another embodiment of the apparatus according the present invention

The present invention will be hereafter explained with reference to drawings regarding an embodiment upon formation of a catalyst layer on an electrolyte membrane that serves as a substrate. Upon formation of a catalyst layer on a gas diffusion layer, the catalyst layer can be formed in a substantially similar manner, except that a gas diffusion layer is used to serve as a substrate instead of an electrolyte membrane. FIG. 1 shows a schematic diagram indicating one embodiment of an apparatus that can preferably carry out the production method of the present invention. FIG. 2 shows a schematic diagram of another embodiment of the apparatus.

An apparatus A comprises an unwinding roller 1 that holds a rolled-up substrate (electrolyte membrane) 2 and a winding roller 3 that winds up the substrate 2 to which electrode powder 10 has adhered and has been fixed. A drive means (not shown) allows the unwinding roller 1 and the winding roller 3 to synchronously rotate so that the substrate 2 is wound up by the winding roller 3 at a constant speed.

A backup material 4 is disposed between the unwinding roller 1 and winding roller 3 so as to support the substrate 2 in motion from behind. Having a certain distance (e.g., approximately 10 mm) from the backup material 4, a mesh-like screen 5 is held by an adequate holding means in a posture parallel to the backup material 4. The screen 5 is moved by a drive means (not shown) for a certain distance in the same direction as, and at a speed synchronous with, the substrate 2 in motion therebelow. Thereafter, the screen 5 returns to the original location. A pattern that is the same pattern used for coating the substrate 2 with electrode powder 10 (adhesion of the powder) (that is, the pattern of an MEA catalyst layer) is formed on the screen 5 with the use of a mesh (e.g., 200 mesh). A conductive material such as SUS or an insulating material made of a resin such as nylon is used for the screen 5. In the path of the substrate 2 in motion, downstream of the screen 5, a thermocompression bonding means 8 such as a heating roller is installed for fixation of electrode powder 10 that has been applied to the substrate 2.

Above the screen 5, a hopper 6 is located. The hopper 6 is filled with electrode powder 10. In addition, on the outlet side of the hopper 6, a feed roller 7 made of an elastic body is disposed in a posture that the center of the rotation axis thereof is orthogonal in the direction of the substrate 2 in motion. In this example, the material of the feed roller 7 is polyethylene; however, it can also be made of polyurethane or gum to which a blowing agent has been added. In addition, a drive means (not shown) allows the feed roller 7 to rotate.

Regarding the screen 5 and the feed roller 7, the feed roller 7 is allowed to come into contact with the surface of the screen 5 by pressure. That is, the feed roller is pressed against the surface of the screen 5 so that the face of the screen 5 in contact with the feed roller 7 becomes crushed and deformed. Accordingly, the feed roller 7 is allowed to partially enter the mesh of the screen 5.

Further, the apparatus A comprises a voltage applying means 20 that applies a voltage of 0 kV to 10 kV upon the screen 5 that an electric field is applied between the substrate 2 and the screen 5. If necessary, a means for triboelectrification (not shown), corona discharge, stirring, or the like is disposed to serve as a means of electrically charging the electrode powder 10 accommodated in the hopper 6.

Further, in the apparatus A shown in the drawings, the hopper 6 and the feed roller 7 are disposed in proximity to each other, and the electrode material 10 in the hopper 6 is always in contact with the feed roller 7. Meanwhile, the hopper 6 and the feed roller 7 may be disposed apart from each other so that the electrode material 10 that falls from the hopper 6 is received by the feed roller 7. Note that, when the electrode powder 10 is electrically charged in such case, variation of coating thickness may be produced due to aggregation of the falling electrode powder. Therefore, preferably in some cases, the powder is not allowed to be electrically charged.

Upon formation of a catalyst layer on an electrolyte membrane that serves as the substrate 2, necessary voltage is applied on the screen 5 by the voltage applying means 20. The hopper 6 is filled with the electric powder 10 and the powder is allowed to be electrically charged, if necessary. The winding roller 3 is driven to move the substrate 2 in the direction of arrows at a certain speed such as 5 m/min. Synchronously, the screen 5 that has been subjected to a desired patterning is moved in the same direction. In addition, the feed roller 7 is allowed to rotate.

The electrode powder 10 in the hopper 6 is expelled from the hopper 6 while being adhered to the surface of the feed roller 7. When the feed roller 7 comes into contact with the surface of the screen 5 by pressure, the electrode powder 10 is supplied on the screen 5 and is electrically charged. Further, as the feed roller 7 rotates, the surface thereof enters the mesh-like screen 5. Thus, the electrode powder 10 is pressed by the surface of the feed roller 7, which is an elastic body. Accordingly, in addition to the electrostatic force due to the applied voltage, extruding force toward the substrate 2 is applied to the electrode powder 10.

The electrode powder 10 can fall from the hopper 6 onto the screen 5 during the rotation of the feed roller 7. Also in such case, the electrode powder 10 that has fallen is pressed by the feed roller 7 when the powder passes under the feed roller 7 due to the movement of the screen 5. Accordingly, in addition to the electrostatic force due to the applied voltage, extruding force toward the substrate 2 is applied to the electrode powder 10.

The electrode powder 10 is dispersed so as to adhere to the substrate 2 via both the electrostatic force and the extruding force of the elastic body. The thus adhered electrode powder 10 is stabilized by fixation on the substrate 2 when the powder passes a heat pressure-bonding means 8 so that a catalyst layer 10a is formed. The substrate 2, while in such condition, is wound up by the winding roller 3. The screen 5 is returned to the original position for subsequent coating upon termination of coating a single sheet of an MEA with electrode powder 10 (adhesion of the powder). In addition, a single screen 5 is moved back and forth so as to be used repeatedly in the examples of the figures; however, a plurality of screens may be used in rotation. Such embodiment is preferable for continuous production.

As described above, according to the present invention, dispersion and adhesion of the electrode powder 10 to the substrate (electrolyte membrane) 2 are carried out via both the electrostatic force and the extruding force so that stabilized dispersion and adhesion can be realized even at a sufficiently safe and low voltage. Therefore, the thickness of the membrane to be formed is constant and the outline of the pattern thereof becomes defined. As a result, the product manufacturing accuracy is improved. Further, since the powder is dispersed toward the substrate by a strong force, the amount of electrode powder wasted due to excessive dispersion can be reduced so that the yield of the electrode powder 10 is improved.

In the apparatus A above, the electrode powder 10 is applied on only one side of the substrate 2 so as to form a catalyst layer. Meanwhile, an apparatus described in FIG. 2 achieves the continuous application of electrode powder 10 to both sides of an electrolyte membrane that serves as the substrate 2. Herein, a feed roller 3a is used instead of the winding roller 3 of the apparatus A shown in FIG. 1. The substrate 2 over which the electrode powder 10 has been fixed so as to form as a catalyst layer 10a, and which has passed through the feed roller 3a, is inverted when passing through a feed roller 3b. To the other side of the inverted substrate 2 over which the catalyst layer 10a is not formed, the electrode powder 10 is applied and fixed thereon using an apparatus As that is the same as the Apparatus A shown in FIG. 1. Accordingly, a catalyst layer 10b is formed. The substrate 2, on both sides of which the electrode powder 10 is fixed in a certain pattern so as to form catalyst layers 10a and 10b, is wound up by the winding roller 3 of the apparatus Aa.

EXAMPLES

The present invention will be hereafter explained with reference to the following example and comparative example.

Example

Coating was performed using the apparatus shown in FIG. 1. Electrode powder comprising 50 wt % platinum-supporting carbon was used (50 wt % Pt/C: electrolyte resin=2:1). The desired amount of the platinum coating was determined to be 0.5 mg/cm$^2$. Apparatus conditions are as follows: applied voltage between screen and substrate: 3 kV; distance between screen and substrate: 10 mm; screen mesh: 200 mesh; and substrate feeding speed: 5 m/min. The screen used was made of stainless steel. A feed roller was allowed to come into contact with the screen by pressure (total pressure applied to the screen by the feed roller in terms of weight: 100 g by weight to 1 kg by weight).

Comparative Example

As in the case of Example 1, a coating test was performed using a feed roller made of a hard, non-elastic body.

[Comparison]

Variation of coating thickness and the difference between the desired amount of coating and the actual amount of coating were determined with respect to catalyst layers that were formed on electrolyte membranes obtained in the Example and the Comparative Example. The results are shown in Table 1. In the case of a feed roller made of a hard body, due to lack of extruding force for the electrode powder, it was required to increase the amount of the powder supplied by increasing the number of revolutions of the feed roller so as to secure the desired amount of coating. The material yield in the above case decreased compared with the case of Example 1. Further, the powder that had remained on the screen mesh generated mesh clogging.

TABLE 1

|  | Example | Comparative Example |
|---|---|---|
| Percentage of Amount of Coating (compared with the desired amount) | ±10% or less | ±20% |
| Variation of Coating Thickness | Not observed | Significantly observed |

As shown in Table 1, a coating membrane having a uniform thickness was obtained in the Example, so that priority of the present invention could be demonstrated.

The invention claimed is:

1. A method for forming a catalyst layer on a substrate constituting a membrane electrode assembly, whereby a catalyst layer is formed by allowing electrode powder to disperse by electrostatic force and extruding force to the substrate, comprising:
   providing a screen having a mesh facing a substrate in a state of non-contact;
   disposing an elastic body in a state of contact with a surface of the screen to supply the electrode powder to the screen;
   applying voltage between the screen and the substrate so as to electrically charge the electrode powder supplied to the screen and to generate an electric field between the screen and the substrate in which the electrically charged electrode powder moves;
   pressing the electrode powder supplied to the screen by the elastic body towards the screen and deforming the elastic body while being pressed against the screen to allow the elastic body to at least partly enter into the mesh of the screen so as to exude the electrode powder through the mesh of the screen towards the substrate; and
   dispersing the electrode powder towards the substrate so as to adhere thereto by the electrostatic force and the extruding force of the elastic body.

2. The method for forming the catalyst layer on the substrate constituting a membrane electrode assembly according to any one of claims 1, wherein the substrate is an electrolyte membrane or a gas diffusion layer.

3. An apparatus for forming a catalyst layer on a substrate constituting a membrane electrode assembly, in which a catalyst layer is formed by allowing electrode powder to disperse by electrostatic force and extrusion force to the substrate, comprising:
   a screen for providing the electrode powder to the substrate;
   a means for holding a screen in a state of non-contact with the substrate;
   a means for holding an elastic body in a state of contact with a surface of the screen so as to supply the electrode powder to the screen;
   a means for applying a voltage between the screen and the substrate so as to electrically charge the electrode powder supplied to the screen and generate an electric field between the screen and the substrate in which the electrically charged electrode powder moves;
   a means for supplying electrode powder to the screen; and
   a means for pressing the electrode powder supplied to the screen by the elastic body towards the substrate, wherein the elastic body is deformed while being pressed against the screen and at least partly enters into the mesh of the screen so as to extrude the electrode powder from the mesh of the screen, and
   wherein the electrode powder is adhered to the substrate by the electrostatic force provided by the voltage applying means and the extruding force provided by the elastic body.

4. The apparatus for forming the catalyst layer on the substrate constituting a membrane electrode assembly according to claim 3, further comprising:
   a hopper that accommodates electrode powder and a feed roller installed on the outlet side of the hopper, in which the feed roller is allowed to roll in contact with the screen by pressure, and wherein the feed roller constitutes a means of supplying electrode powder to the screen and a means of pressing electrode powder supplied on the screen toward the substrate, which is an electrolyte membrane or a gas diffusion layer.

5. The apparatus for forming the catalyst layer on the substrate constituting a membrane electrode assembly according to claim 4, comprising a means by which electrode powder accommodated in the hopper is electrically charged.

* * * * *

UNITED STATES PATENT AND TRADEMARK OFFICE
CERTIFICATE OF CORRECTION

PATENT NO. : 7,455,888 B2 Page 1 of 1
APPLICATION NO. : 10/588150
DATED : November 25, 2008
INVENTOR(S) : Satoshi Kadotani et al.

It is certified that error appears in the above-identified patent and that said Letters Patent is hereby corrected as shown below:

Title Page, item (73): should read as follows,

-- (73) Assignee: Toyota Jidosha Kabushiki ~~Kaishi~~ Kaisha, --.

Signed and Sealed this

Twenty-fifth Day of August, 2009

David J. Kappos
*Director of the United States Patent and Trademark Office*